US006807528B1

(12) United States Patent
Truman et al.

(10) Patent No.: US 6,807,528 B1
(45) Date of Patent: Oct. 19, 2004

(54) ADDING DATA TO A COMPRESSED DATA FRAME

(75) Inventors: Michael M. Truman, San Francisco, CA (US); Matthew A. Watson, Oakland, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 308 days.

(21) Appl. No.: 09/851,589

(22) Filed: May 8, 2001

(51) Int. Cl.[7] .......................... G10L 21/04; H04B 1/66

(52) U.S. Cl. ........................ 704/229; 704/500; 370/528

(58) Field of Search ................................ 704/211, 215, 704/270, 500, 501, 229, 200.1; 370/345, 477, 528; 725/9, 14, 18

(56) References Cited

U.S. PATENT DOCUMENTS

| | | | | | |
|---|---|---|---|---|---|
| 4,972,484 | A | | 11/1990 | Theile et al. | |
| 5,161,210 | A | | 11/1992 | Druyvesteyn et al. | |
| 5,727,119 | A | * | 3/1998 | Davidson et al. | 704/203 |
| 5,787,334 | A | * | 7/1998 | Fardeau et al. | 725/22 |
| 5,825,976 | A | | 10/1998 | Dorward et al. | |
| 6,122,271 | A | * | 9/2000 | McDonald et al. | 370/345 |
| 6,275,509 | B1 | * | 8/2001 | Schlosser et al. | 370/527 |
| 6,421,445 | B1 | * | 7/2002 | Jensen et al. | 380/253 |
| 6,505,160 | B1 | * | 1/2003 | Levy et al. | 704/270 |
| 6,529,550 | B2 | * | 3/2003 | Tahara et al. | 375/240 |
| 6,661,771 | B1 | * | 12/2003 | Cupo et al. | 370/204 |

FOREIGN PATENT DOCUMENTS

| | | |
|---|---|---|
| EP | 0290581 | 11/1987 |
| EP | 0372601 | 8/1989 |
| GB | 2063018 | 5/1981 |

OTHER PUBLICATIONS

G. A. Soulodre et al.: "Subjective Evaluation of State–of–the–Art Two Channel Audio Codecs" J. Audio Eng. Soc., vol. 46, No. 3, pp 164–177, Mar. 1998.

Mark F. Davis "The AC–3 Multichannel Coder", Prod. of the 95$^{th}$ AES Convention, 1993.

M. Bosi, K. Brandenburg, S. Quackenbush, L. Fielder, K. Akagiri, H. Fuchs, M. Dietz, J. Herre, G. Davidson, Y Oikawa: "ISO/IEC MPEG–2 Advanced Audio Coding", Journal of the AES, vol. 45, No. 10, Oct. 1997; pp. 789–814.

ISO/IEC 13818–7. "MPEG–2 advanced audio coding, AAC". International Standard, 1997.

(List continued on next page.)

*Primary Examiner*—Richemond Dorvil
*Assistant Examiner*—Martin Lerner
(74) *Attorney, Agent, or Firm*—Gallagher & Lathrop; Thomas A. Gallagher

(57) ABSTRACT

Many low bit rate digital audio encoding systems, including Dolby Digital and MPEG-2 AAC generate data streams in which unused dummy, fill, stuffing, or null bits exist whenever the bit allocation function in the encoder does not utilize all available bits from a bit pool. Instead, all or some of such wasted bits are used to carry information. This can be accomplished after an encoder generates a bitstream. The resulting bitstream is analyzed to identify the locations of some or all of the unused bits. Some or all of the identified unused bits are then replaced with information-carrying bits to embed information-carrying bits in locations formerly occupied by unused bits. Alternatively, instead of replacing some or all unused bits in the bitstream with information-carrying bits after encoding, a modified encoder may insert information-carrying bits in some or all of the unused bit positions during the encoding process.

11 Claims, 1 Drawing Sheet

OTHER PUBLICATIONS

M. Bosi, K. Brandenburg, S. Quackenbush, L. Fielder, K. Akagiri, H. Fuchs, M. Dietz, J. Herre, G. Davidson and Y. Oikawa: "ISO/IEC MPEG–2 Advanced Audio Coding". Prod. of the $101^{st}$ AES–Convention, 1996.

Karlheinz Brandenburg: "MP3 and AAC explained". Prod. of the AES $17^{th}$ International Conference on High Quality Audio Coding, Florence, Italy, 1999.

*Digital Audio Compression Standard* (Dolby AC–3), Document A/52, Advanced Television Systems Committee, Approved Nov. 10, 1994. (Rev 1) Annex A added Apr. 12, 1995. (Rev 2) 13 corrigenda added May 24, 1995. (Rev 3) Annex B and C added Dec. 20, 1995. available on the Internet at http://www.atsc.org/Standards/A52/.

Errata sheet for Document A/52, Jul. 22, 1999, Dolby Laboratories document S99/12496/12659, available on the Internet at http://www.dolby.com/tech/ATSC_err.pdf.

"Design and Implementation of AC–3 Coders," by Steve Vernon, *IEEE Trans. Consumer Electronics*, vol. 41, No. 3, Aug. 1995.

J. Princen and A. Bradley, "Analysis/Synthesis Filter Bank Design Based on Time Domain Aliasing Cancellation," *IEEE Trans. ASSP*, vol. ASSP–34, No. 5, pp. 1153–1161, Oct. 1986.

"Design and Implementation of AAC Decoders" by Matthew A. Watson and Peter Buettner, 2000 Digest of Technical Papers, International Conference on Consumer Electronics, Nineteenth in the Series (Cat. No. 00CH 37102) 2000, pp. 408–409, XP002213111 Los Angeles, Piscataway, NJ, USA, IEEE, USA, ISBN: 0–7803–6401–9 the whole document.

* cited by examiner

ADDING DATA TO A COMPRESSED DATA FRAME

BACKGROUND OF THE INVENTION

The invention relates to data rate compression systems, such as low bit rate audio encoding and decoding systems.

Many low bit rate digital audio encoding systems, including Dolby Digital and MPEG-2 AAC generate data streams in which unused bits exist whenever the bit allocation function in the encoder does not utilize all available bits from a bit pool for encoding the audio signal. This occurs if the final bit allocation falls short of using all available bits or if the input audio does not require all available bits. Such unused bits (often referred to as dummy, fill, stuffing, or null bits) are wasted bits that carry no useful information.

SUMMARY OF INVENTION

According to the present invention all or some of such wasted bits are used to carry information. The replacement of wasted bits with information-carrying bits can be accomplished after an encoder generates a bitstream. In that case, a conventional, unmodified encoder may be employed to generate a standard bitstream. The resulting bitstream is analyzed to identify the locations of some or all of the unused bits. Some or all of the identified unused bits are then replaced with information-carrying bits so that the information-carrying bits are embedded in locations formerly occupied by unused bits. Alternatively, instead of replacing some or all unused bits in the bitstream with information-carrying bits after encoding, a modified encoder may insert information-carrying bits in some or all of the unused bit positions instead of null bits during the encoding process.

Whether the bitstream is modified during or after the encoding process, the resulting modified bitstream should appear the same to a conventional decoder. An unmodified decoder receiving the modified bitstream should ignore the information-carrying bits in the same way it ignores or skips over null bits in the same bit locations. The information-carrying bits that replace unused bits can be recovered either in a modified decoder or in a special decoder that identifies the locations of unused bits, detects the data in the unused bit locations and reports the data. In either case, recovery of the data replacing unused bits in the bitstream does not disturb the remainder of the bitstream. Thus, the present invention preserves audio quality in two ways: it does not use bits that would otherwise be used for audio and it avoids the need for decoding and re-encoding the bitstream.

In a first aspect, the invention is a method for generating a digital bitstream that recurringly captures blocks of input data and processes the blocks of input data to produce blocks shorter than the blocks of input data. In each of the shorter blocks some of the bits represent the input data and have a number which is at least the number of bits allocated from a pool of bits by an adaptive bit allocation process and some of the bits do not represent the input data and have a number which is the number of bits remaining in the pool of bits that are not allocated by the adaptive bit allocation process. Some or all of the bits not representing the input data represent other information. The shorter blocks are assembled to deliver the digital bitstream.

In another aspect, the invention is a method for generating a digital bitstream that recurringly captures blocks of input data and processes the blocks of input data to produce blocks shorter than the blocks of input data. In each of the shorter blocks some of the bits represent the input data and have a number which is at least the number of bits allocated from a pool of bits by an adaptive bit allocation process and some of the bits do not represent the input data and have a number which is the number of bits remaining in the pool of bits that are not allocated by the adaptive bit allocation process. Some or all of the bits not representing the input data represent no information. The shorter blocks are assembled to deliver a digital bitstream, and the digital bitstream is modified by replacing all or some of the bits carrying no information with bits representing information other than the input data.

In a further aspect, the invention is a method for processing a digital bitstream, that receives a digital bitstream in which some of the bits are bits representing input data, the number of which is at least the number of bits allocated from a pool of bits by an adaptive bit allocation process, some of the bits are bits not representing input data, the number of which is the number of bits remaining in the pool of bits that are not allocated by the adaptive bit allocation process, and wherein some or all of the bits not representing input data represent other information. Bits not representing the input data that represent other information are identified, and the identified bits are decoded to recover the other information.

DESCRIPTION OF THE PREFERRED EMBODIMENTS

Dolby Digital, also known as Dolby AC-3 (Dolby is a trademark of Dolby Laboratories Licensing Corporation), is a flexible audio data compression technology capable of encoding a variety of audio channel formats into a single low-rate bitstream. Details are set forth in *Digital Audio Compression Standard* (*Dolby AC*-3), Document A/52, Advanced Television Systems Committee, Approved 10 Nov. 1994. (Rev 1) Annex A added 12 Apr. 1995. (Rev 2) 13 corrigenda added 24 May 1995. (Rev 3) Annex B and C added 20 Dec. 1995. The A/52 document is available on the Internet at:

http://www.atgc.org/Standards/A52/.

See also the errata sheet at:

http://www.dolby.com/tech/ATSC_err.pdf.

See also "Design and Implementation of AC-3 Coders," by Steve Vernon, *IEEE Trans. Consumer Electronics*, Vol. 41, No. 3, Aug. 1995. Eight channel configurations are supported, ranging from conventional mono or stereo to a surround format with six discrete channels. The Dolby Digital bitstream specification permits rates of 48 kHz, 44.1 kHz, or 32 kHz, and supports data rates ranging from 32 kbps (kilobits per second) to 640 kbps.

Figure 1:
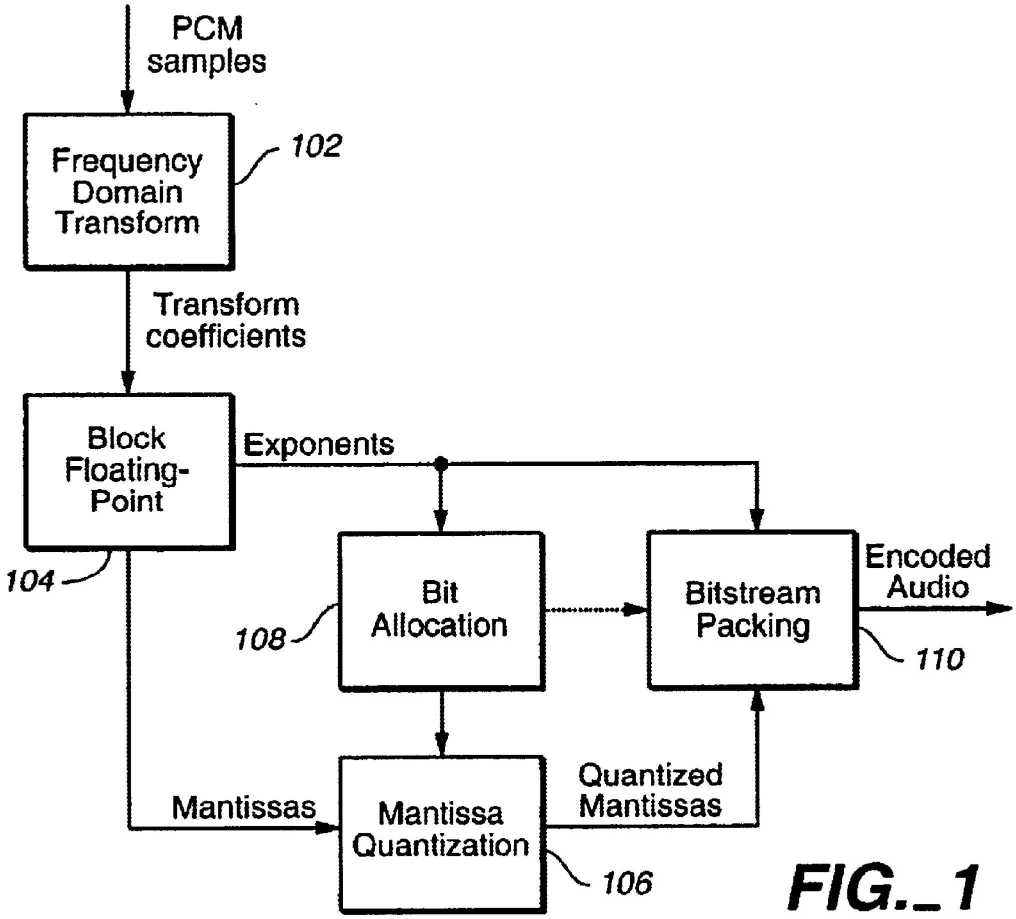
FIG. 1 is a simplified block diagram of a Dolby Digital encoder.

A simplified Dolby Digital encoder block diagram is shown in FIG. 1. PCM audio samples are applied to a frequency domain transform function 102. A 512-point Princen and Bradley modified discrete cosine transform (MDCT) with 50% overlap is employed. See J. Princen and A. Bradley, "Analysis/Synthesis Filter Bank Design Based on Time Domain Aliasing Cancellation," *IEEE Trans. ASSP*, Vol. ASSP-34, No. 5, pp. 1153–1161, October 1986. In the event of transient signals, improved performance is achieved by using a block-switching technique in which two 256-point transforms are computed in place of the 512-point transform. The transform coefficients from function 102 are applied to a block floating point process 104 that breaks the transform coefficients into exponent and mantissa pairs. The mantissas are then quantized in mantissa quantization function 106 with a variable number of bits assigned by a bit allocation function 108 that operates on a parametric bit allocation model in response to the block floating point exponents.

The Dolby Digital bit allocation model uses principles of psychoacoustic masking to decide how many bits to provide for each mantissa in a given frequency band. Depending on the extent of masking, some mantissas may receive very few bits or even no bits at all. This reduces the number of bits needed to represent the source, at the expense of (inaudible) added noise.

Unlike some other coding systems, Dolby Digital does not pass the bit allocation results to the decoder in the bitstream. Rather, a parametric approach is taken, in which the encoder constructs its masking model based on the transform coefficient exponents and a few key signal-dependent parameters. These parameters are passed from the bit allocation function 108 to the bitstream packing function 110 for passing to the decoder via the bitstream, using far fewer bits than would be necessary to transmit the raw bit allocation values. The bitstream packing function 110 that generates the encoded audio bitstream also receives the exponents and the quantized mantissas. At the decoder, the bit allocation is reconstructed based on the exponents and bit allocation parameters. This arrangement constitutes a hybrid backward/forward adaptive bit allocation.

The coding efficiency of Dolby Digital improves as the number of source channels increases. This is due to two principle features: a global bit pool and high frequency coupling. The global bit pool technique allows the bit allocator to split the available bits among the audio channels on an as-needed basis. If one or more channels are inactive at a specific time instant, the remaining channels will receive more bits than they would if all channels are in high bit demand.

In the Dolby Digital audio compression system, the bit allocation process employs a finite search. In each iteration of the search, the signal to noise (SNR) parameter is varied to control the allocation. This also affects the values of other parameters. At the end of the search, if the used bits exceed the allocated bits, the last legal allocation is used. Often, this allocation is not able to use all of the available bits, leaving unused or wasted bits.

Figure 2:
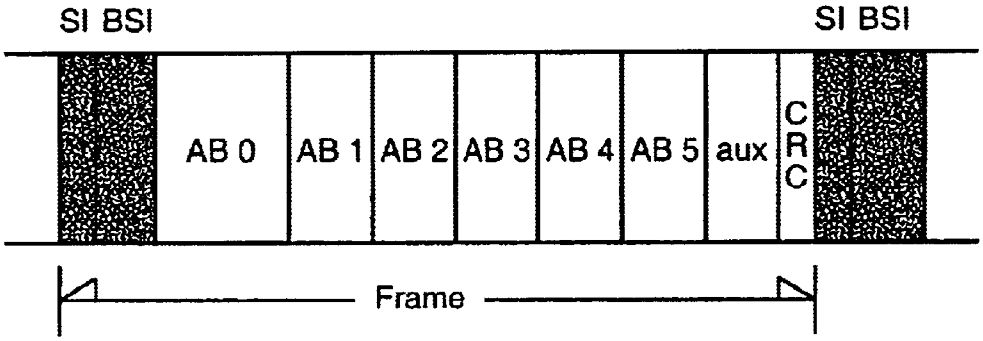
FIG. 2 is simplified conceptual depiction of a Dolby Digital serial coded audio bitstream. It is not to scale.

A Dolby Digital serial coded audio bitstream is made up of a sequence of frames as shown generally in FIG. 2. Every frame represents a constant time interval of 1536 PCM samples across all coded channels and contains six coded audio blocks (AB0 through AB5), each representing 256 new audio samples. Each frame has a fixed size (one of several fixed numbers of bits in the range of 64 to 1920 bits) that depends on the PCM sample rate (32 kHz, 44.1 kHz or 48 kHz) and the coded bit rate (discrete values in the range of 32 kbps to 640 kbps). A synchronization information (SI) header at the beginning of each frame contains information needed to acquire and maintain synchronization. A bit stream information (BSI) header follows SI, and contains parameters describing the coded audio service. The SI and BSI fields describe the bitstream configuration, including sample rate, data rate, number of coded channels, and several other systems-level elements. Following the coded audio blocks is an auxiliary data (aux) field. At the end of each frame is an error check field that includes a CRC word (cyclic redundancy correction code word) for error detection. Another CRC word is located in the SI header.

Although the width of the bitstream elements in FIG. 2 generally suggests a typical number of bits in each element, the figure is not to scale. The number of bits in the audio blocks and in the aux field is variable. Block AB0 is shown wider than the other blocks because each frame is essentially independent of other frames and blocks AB1 through AB5 may share information carried by block AB0 without repeating the information, allowing blocks AB1 through AB5 to carry fewer bits than block AB0. Aside from possible sharing, audio blocks also have variable length because of the variable number of bits that are assigned to mantissa data in each block.

Unused bits exist in a frame whenever the bit allocation function in the encoder does not utilize all available bits for encoding the audio signal. This occurs if the final bit allocation falls short of using all available bits or if the input audio does not require all available bits. Because these unused bits must be placed somewhere in the frame in order for the frame to have its fixed size, the encoder inserts dummy or null bits in the bitstream in order to fill out the length of the frame. Such null bits are inserted in a "skip field" in one or more of the audio blocks and in the aux field. Each skip field accepts null bits in 8-bit bytes, while the aux field accepts up to seven null bits to provide "fine tuning" of the frame length and to assure that the final CRC word occurs in the last 16 bits of the frame. In practice, the null bits are random bits. Such null bits are wasted bits that carry no useful information. It is an aspect of the present invention to use the data positions of all or some of such null bits to carry information.

Null bits in skip fields and in the aux field are skipped or ignored by the decoder. Although a Dolby Digital decoder is able to identify null bits and ignore them, the number of null bits and their location in the bitstream is not known a priori (their number and location varies from frame to frame, i.e., the skip fields are of variable size and their starting positions in blocks AB1 through AB5 vary and, similarly, the aux field is of variable size and its starting position varies) nor is it possible to discern their number and location by mere inspection of the Dolby Digital bitstream (null bits are random and are indistinguishable from other data in the bitstream).

Each audio block (AB0 through AB5) begins with "fixed data" made up of bitstream elements whose word sizes (bit lengths) are known a priori (i.e., these fixed data elements have a preassigned number of bits and are not assigned bits by bit allocation). Fixed data is a collection of parameters and flags including block switch flags, coupling information, exponents, and bit allocation parameters. Following the fixed data is "skip field" data having a minimum size of 1 bit, if the skip field contains no null bits, and a maximum size of 522 bits, if it does contain null bits. A one-bit word, the minimum contents of a skip field, indicates if the skip field includes null bits. If it does, next, a 9-bit word indicates the number of bytes of null bits. This is followed by the null bytes. Following the skip is the mantissa data. The size of the mantissa data is variable and is determined by bit allocation.

Whether a particular audio block contains a skip field having null bits is determined by the following rules: 1) the combined size of the syncinfo fields (namely, the syncword, the first CRC word, the sampling frequency code word and the frame size code word), the BSI fields, audio block 0 and audio block 1 will never exceed ⅝ of the frame, and 2) the combined size of the block 5 mantissa data, the aux data field, and the errorcheck field will never exceed the final ⅜ of the frame. The ⅝ and ⅜ configuration is used to reduce latency (the first CRC word applies to the first ⅝ of the frame, permitting faster decoding). In principle, were it not for the ⅝ and ⅜ configuration, all null bits could be inserted in the aux field without a need for one or more skip fields.

The aux data field has two functions. One function of the aux data field, mentioned above, is to provide a fine tuning of the frame length and to assure that the last 16 bits of the frame is used for the second CRC word. Up to seven null bits are inserted in the aux field. A second function of the aux field, which is optional and is independent of the first function, is to carry additional information ("auxdata") at the expense of using bits that could otherwise be assigned to mantissas in the audio blocks. The last bit of the aux data field indicates whether any optional auxdata exists. If the bit indicates that it does exist, the preceding 14-bit word indicates the length of the auxdata and the next preceding bits are the auxdata. Null bits, if any, in turn precede the auxdata in the aux field. If the auxfield has no auxdata, the null bits, if any, precede the single bit at the end of the aux data field that indicates if auxdata exists. Thus, whether or not there is auxdata, there may or may not be null bits it the aux field. There are no null bits in the aux field if there are no unused bits (it is possible for no unused bits to exist in a given frame but the probability of this occurring in many consecutive frames is extremely low) or if the number of null bits is divisible by eight and, thus, all of the null bits are carried in one or more skip fields.

Further details of Dolby Digital coding, including the decoding process, are set forth in the above-cited "Design and Implementation of AC-3 Coders," by Steve Vernon, *IEEE Trans. Consumer Electronics*, Vol. 41, No. 3, August 1995 and in the above-cited A/52 document.

In the standard Dolby Digital coding arrangement, null bits in the aux field and/or the aux field and one or more skip fields, are unused or wasted bits—they carry no useful information. In accordance with the present invention, some or all of such unused bits are replaced with information-carrying bits while preserving full compatibility with existing Dolby Digital encoders and decoders and avoiding any degradation of the encoded audio signals. The new information-carrying bits should conform to a known or predetermined format or syntax so that they can be recovered by a decoding process.

The replacement of wasted bits with information-carrying bits can be accomplished after a Dolby Digital encoder creates a Dolby Digital bitstream. In that case, a conventional, unmodified Dolby Digital encoder may be employed to generate a standard Dolby Digital bitstream. The resulting bitstream is analyzed to identify the locations of some or all of the unused bits in each frame. Some or all of the identified unused bits are then replaced with information-carrying bits so that the information-carrying bits are embedded in locations formerly occupied by unused bits. Because some of the data is changed (some or all of the null bits are changed), the checksum for the entire frame is recalculated and the second CRC word, which applies to the entire frame, is replaced with a new CRC word, and, if data in the first ⅜ of the frame is changed, the checksum for that portion of the frame is recalculated and the first CRC word, which applies to the first ⅜ of the frame, is also replaced with a new CRC word. Alternatively, instead of replacing some or all unused bits in the Dolby Digital bitstream with information-carrying bits after encoding, a modified Dolby Digital encoder may insert information-carrying bits in some or all of the unused bit positions of a frame instead of random null bits during the encoding process. The required modifications to a conventional Dolby Digital encoder would be very small. Future Dolby Digital encoders could include aspects of the present invention.

Whether the Dolby Digital bitstream is modified before or after the encoding process, the resulting modified bitstream appears the same to a conventional Dolby Digital decoder. An unmodified Dolby Digital decoder receiving the modified bitstream will ignore the information-carrying bits in the same way it ignores or skips over null bits in the same bit locations. The information-carrying bits that replace unused bits can be recovered either in a modified Dolby Digital decoder or in a special decoder that identifies the locations of unused bits in a frame, detects the data in the unused bit locations and reports the data. In either case, recovery of the data replacing unused bits in Dolby Digital bitstream does not disturb the remainder of the bitstream. Thus, the present invention preserves audio quality in two ways: it does not use bits that would otherwise be used for audio and it avoids the need for decoding and reencoding the bitstream.

In practice, a device adapted to modify an already-generated Dolby Digital bitstream in accordance with the present invention will include many of the elements or processes required in a device for extracting information from a Dolby Digital bitstream that has been modified in accordance with the present invention. For example, both devices perform an error check and then identify the locations of null bits in each frame.

In one aspect of the present invention, only unused bits, bits not assigned by the bit allocation process in a frame, are candidates for replacement by information-carrying bits. Thus, the full quality potential of the coding system is maintained (no bits are taken from the assignable bit pool, allowing the bit assignment process to optimize its bit assignments). However, a consequence of this approach is that the number of bits available for replacement by information-carrying bits varies from frame to frame such that some frames have no bit locations available or only a small number of bit locations. If the additional information to be inserted in the unused bit positions is not time sensitive and there are sufficient bit positions over a period of time, this is not a problem—the new information-carrying bits are inserted on a space-available basis, possibly skipping one or more frames in which there are no unused bits. In some cases, the information to be inserted in unused bit positions may require a minimum bit rate. Thus, another aspect of the invention is that when a minimum bit rate is required, the information-carrying bits that need to be sent first use all available unused bits and then, if necessary in a particular frame, take bits from the mantissa-allocation bit pool. While this leaves the bit assignment process with fewer bits to assign, thereby degrading the audio quality, if the number of bits taken from the bit pool is relatively small, the discernable degradation may be acceptable. This is most easily done by using the optional auxdata feature in the Dolby Digital aux field, which feature is described above.

As mentioned above, the ⅝- and ⅜-frame configuration in cooperation with two CRC words is used to reduce latency.

The present invention may also be applied to the MPEG-2 AAC audio coding system. MPEG-2 AAC is described in the following documents:

1) ISO/IEC 13818-7. "MPEG-2 advanced audio coding, AAC". International Standard, 1997;

2) M. Bosi, K. Brandenburg, S. Quackenbush, L. Fielder, K. Akagiri, H. Fuchs, M. Dietz, J. Herre, G. Davidson, and Y. Oikawa: "ISO/IEC MPEG-2 Advanced Audio Coding". Proc. of the 101st AES-Convention, 1996;

3) M. Bosi, K. Brandenburg, S. Quackenbush, L. Fielder, K. Akagiri, H. Fuchs, M. Dietz, J. Herre, G. Davidson, Y. Oikawa: "ISO/IEC MPEG-2 Advanced Audio Coding", Journal of the AES, Vol. 45, No. 10, October 1997, pp. 789–814;

4) Karlheinz Brandenburg: "MP3 and AAC explained". Proc. of the AES 17th International Conference on High Quality Audio Coding, Florence, Italy, 1999; and 5) G. A. Soulodre et al.: "Subjective Evaluation of State-of-the-Art Two-Channel Audio Codecs" J. Audio Enc. Soc., Vol. 46, No. 3, pp 164–177, March 1998.

In the MPEG-2 AAC system, fill element bits are added to the bitstream if the total bits for all audio data together with all additional data is lower than the minimum allowed number of bits in a frame necessary to reach a target bit rate. According to reference 3) at pages 803–4, cited above:

> The fill_ele is a bit-stuffing mechanism that enables an encoder to increase the instantaneous rate of the compressed audio stream such that it fills a constant rate channel. Such mechanisms are required as, first, the encoder has a region of convergence for its target bit allocation so that the bits used may be less than the bit budget, and second, the encoder's representation of a digital zero sequence is so much less than the average coding bit budget that it must resort to bit stuffing.

Thus, MPEG-2 AAC fill element bits are unused bits in the same sense as the null bits in the Dolby Digital aux field and skip fields and aspects of the invention are also applicable to MPEG-2 AAC. In addition, aspects of the present invention may be applicable to coding systems other than Dolby Digital and MPEG-2 AAC.

Although the present invention is useful in many environments and for the purpose of adding information-carrying bits for many purposes, one use for the present invention is in a television broadcast system able to track when and what a viewer watched. For example, a television program having a Dolby Digital audio bitstream is pre-encoded and distributed to various broadcast locations. Upon broadcast, a broadcaster modifies the Dolby Digital audio bitstream in accordance with the present invention to add information-carrying bits conveying the broadcast time, the program identification and the broadcaster identification. The television program with the modified bitstream is broadcast to viewers. At a viewer's location, the broadcast time, program identification and broadcaster identification are detected and reported to a device for tracking viewer's viewing actions. Such information is useful for television rating's services, for example. In practice, detecting, decoding and reporting the added information-carrying bits in the Dolby Digital bitstream is facilitated because Dolby Digital set top boxes provide a Dolby Digital bitstream output.

We claim:

1. A method for generating a digital audio bitstream by an encoder and for modifying the digital audio bitstream produced by the encoder, comprising

- at a first site where a television program having a digital audio bitstream is pre-encoded and distributed to broadcast locations:
  - recurringly capturing blocks of input data in the encoder,
  - processing said blocks of input data in the encoder to produce blocks shorter than said blocks of input data, wherein in each of which shorter blocks:
    - some of the bits represent said input data and have a number which is at least the number of bits allocated from a pool of bits by an adaptive bit allocation process,
    - some of the bits do not represent said input data and have a number which is the number of bits remaining in the pool of bits that are not allocated by said adaptive bit allocation process,
    - wherein some or all of said bits not representing said input data represent no information,
  - assembling the shorter blocks to deliver a digital bitstream from the encoder, and
- at a second site where a broadcaster broadcasts the television program with a modified audio bitstream:
  - modifying the digital bitstream delivered by the encoder by replacing all or some of the bits carrying no information with bits representing information other than said input data, wherein the information other than said input data includes information about the broadcast and broadcaster.

2. A method for processing a digital audio bitstream, comprising

- receiving, at as second site where a broadcaster broadcasts a television program with a modified bitstream, a digital audio bitstream produced by an encoder at a first site where the television program having a digital audio bitstream is pre-encoded and distributed to broadcast locations in which
  - blocks of input data are recurringly captured,
  - said blocks of input data are processed to produce blocks wherein in each of which blocks:
    - some of the bits represent said input data and have a number which is at least the number of bits allocated from a pool of bits by an adaptive bit allocation process,
    - some of the bits do not represent said input data and have a number which is the number of bits remaining in the pool of bits that are not allocated by said adaptive bit allocation process,
    - wherein some or all of said bits not representing said input data represent no information,
  - the produced blocks are assembled to deliver a digital bitstream, and
- modifying the digital bitstream at said second site by replacing all or some of the bits carrying no information with bits representing information other than said input data, wherein the information other than said input data includes information about the broadcast and broadcaster.

3. A method according to claim 1 wherein the information about the broadcast and broadcaster includes the broadcast time, the program identification and the broadcaster identification.

4. A method according to claim 1 or claim 2 wherein said modifying the digital bitstream includes performing an error check on the digital bitstream from the encoder, identifying the location of bits carrying no information, and replacing one or more error detection codewords in the bitstream after replacing all or some of the bits carrying no information with bits representing information other than said input data.

5. A method according to claim 2 wherein the information about the broadcast and broadcaster includes the broadcast time, the program identification and the broadcaster identification.

6. A method for broadcasting a television program having a modified digital audio bitstream in which some of the bits carry information about the broadcast and broadcaster, comprising

- receiving, at a second site where a broadcaster broadcasts said television program with said modified bitstream, a digital audio bitstream produced by an encoder at a first site where a television program having a digital audio bitstream is encoded and distributed to broadcast locations in which blocks of input data are recurringly captured, said blocks of input data are processed to produce blocks wherein in each of which blocks:

some of the bits represent said input data and have a number which is at least the number of bits allocated from a pool of bits by an adaptive bit allocation process, some of the bits do not represent said input data and have a number which is the number of bits remaining in the pool of bits that are not allocated by said adaptive bit allocation process, wherein some or all of said bits not representing said input data represent no information, and the produced blocks are assembled to deliver a digital bitstream, and at said second site:

modifying the digital bitstream produced at a first site by replacing all or some of the bits carrying no information with bits that include bits which represent information about the broadcast and broadcaster to produce a modified digital audio bitstream, and broadcasting the television program with the modified digital audio bitstream.

7. A method according to claim 6 wherein the information about the broadcast and broadcaster includes the broadcast time, the program identification and the broadcaster identification.

8. A method according to claim 6, wherein said modifying the digital bitstream includes performing an error check on the digital bitstream from the encoder, identifying the location of bits carrying no information, and replacing one or more error detection codewords in the bitstream after replacing all or some of the bits carrying no information with bits representing information about the broadcast and broadcaster.

9. A method for processing a modified digital audio bitstream of a television broadcast at a third site, a viewer location, comprising receiving at said third site a digital audio bitstream that has been modified by a broadcaster at a second site to replace some or all of the bits in a digital bitstream carrying no information with bits representing information about the broadcast and broadcaster, the digital bitstream modified by the broadcaster having been produced by an encoder at a first site where a television program having said digital bitstream is encoded and distributed to broadcast locations in which blocks of input data are recurringly captured, said blocks of input data are processed to produce blocks wherein in each of which blocks:

some of the bits represent said input data and have a number which is at least the number of bits allocated from a pool of bits by an adaptive bit allocation process, some of the bits do not represent said input data and have a number which is the number of bits remaining in the pool of bits that are not allocated by said adaptive bit allocation process, wherein some or all of said bits not representing said input data represent no information, and the produced blocks are assembled to deliver a digital bitstream, and at said third site:

detecting the information about the broadcast and broadcaster, and reporting the information about the broadcast and broadcaster to a device for tracking the viewer's viewing actions.

10. A method according to claim 9 wherein the information about the broadcast and broadcaster includes the broadcast time, the program identification and the broadcaster identification.

11. A method according to claim 9, wherein said receiving receives a digital audio bitstream that also has been modified by a broadcaster to replace one or more error detection codewords in the bitstream after replacing all or some of the bits carrying no information with bits representing information about the broadcast and broadcaster.

* * * * *